Oct. 30, 1962 N. D. ANDREAS 3,060,797
SLIDE PROJECTOR
Filed Sept. 3, 1959
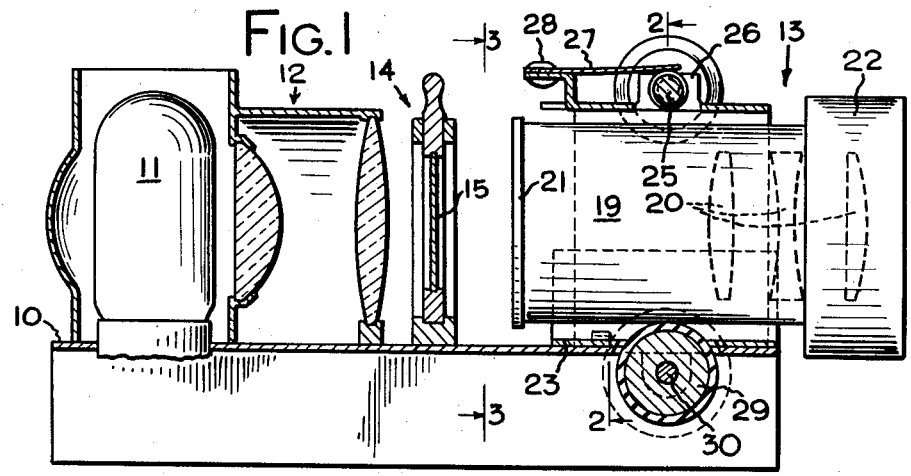
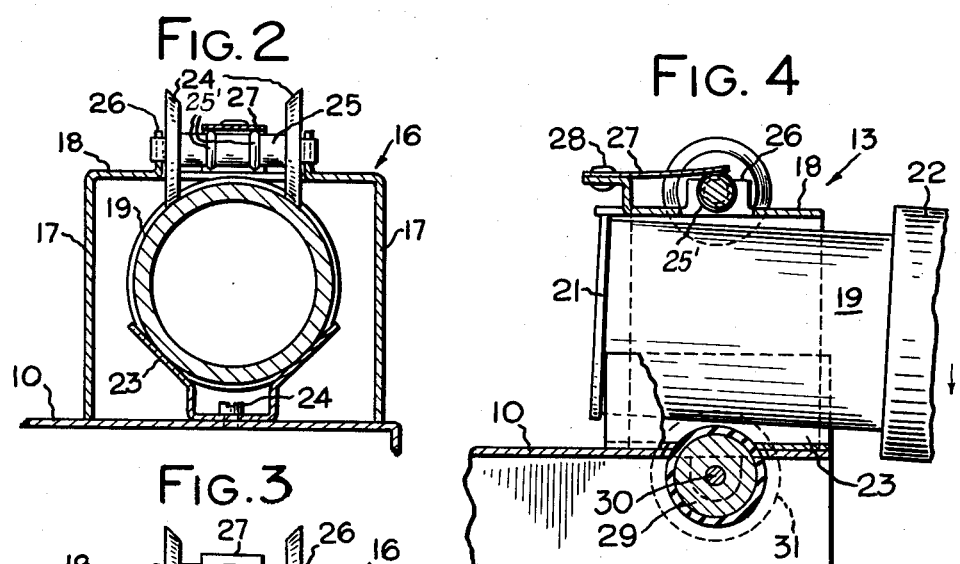
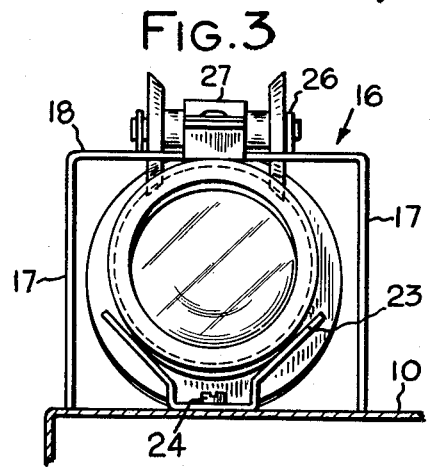
NORMAN D. ANDREAS
INVENTOR.
BY *Frank C. Parker*
ATTORNEY

United States Patent Office 3,060,797
Patented Oct. 30, 1962

3,060,797
SLIDE PROJECTOR
Norman D. Andreas, Greece, N.Y., assignor to Bausch & Lomb Incorporated, a corporation of New York
Filed Sept. 3, 1959, Ser. No. 837,794
1 Claim. (Cl. 88—24)

The present invention relates in general to slide projectors and is more particularly concerned with projection lens assemblies therefor.

The principal object of the present invention is to provide an improved housing or mounting tube for a projection lens assembly which will readily admit of longitudinal focusing adjustment of the lens assembly, but will prevent the lens assembly from being accidentally removed from the slide projector. In this connection, it is contemplated that the projection lens mounting tube will be provided with a peripheral collar at its rear end which cooperates with the rear end of a V-shaped trough within which the projection lens assembly is seated in order to limit the relative movement of the projection lens assembly in a forward direction but which will, upon tilting of the projection lens assembly, readily permit removal of the lens assembly from the projector.

The foregoing objects and others, as well as numerous advantages will become apparent from the following detailed description when read in conjunction with the accompanying drawing wherein:

FIG. 1 is a side elevational view shown partly in section and illustrating the principal features of the present invention;

FIG. 2 is a sectional view taken substantially along the line 2—2 in FIG. 1 and looking in the direction of the arrows;

FIG. 3 is a sectional view taken substantially along the line 3—3 in FIG. 1 and looking in the direction of the arrows; and FIG. 4 is a fragmentary side elevational view illustrating the projection lens assembly tilted just prior to removal thereof from the slide projector.

With reference now to the drawings, wherein like reference numerals have been used in the different views to identify identical parts, the present invention comprises a slide projector having a mounting base 10 on which the various elements of the slide projector are mounted. The slide projector includes a projection lamp 11, the details of which form no part of the present invention, and which, therefore, will not be described in any greater detail, a condenser lens assembly 12, a projection lens assembly 13, and a transparent slide mounting means 14.

The projection lamp 11, condenser lens assembly 12, and projection lens assembly 13 are all adapted to be optically aligned and a transparent slide 15 is adapted to be disposed within the slide mounting means 14 in order to form the object, the image of which is adapted to be projected upon a viewing screen (not shown). The transparent slide 15, of course, is also mounted in optical alignment with the condenser lens assembly 12 and projection lens assembly 13.

The projection lens assembly 13 is disposed generally within a projection lens assembly housing 16, which comprises a box-like member, having sides 17 suitably affixed to the mounting plate 10 and a top 18. The projection lens assembly 13 comprises an elongated substantially cylindrical tube 19 with a plurality of lenses 20 mounted therein and is formed with a rear peripheral collar 21, which projects slightly beyond the outer periphery of the tube portion 19, and a forward peripheral collar 22 which is rotatably mounted on the leading end of the tube 19 in order to permit of slight adjustment of one or more of the lenses 20.

The projection lens assembly tube 19 is adapted to be seated within a V-shaped trough 23 which is secured to the base 10 by means of suitable bolts 24. The trough 23 is accurately positioned so as to maintain optical alignment of the projection lens assembly 13 with respect to the condenser lens assembly 12 even though the projection lens assembly 13 is longitudinally adjusted. In order to retain the projection lens assembly 13 in relatively fixed position in the trough 23, a pair of spring pressed nylon beveled rollers are rotatably mounted on a shaft 25, which extends through a pair of U-shaped slots formed in upstanding portions 26, integral with the top 18 of the projection lens assembly housing 16. A flat spring 27 having one end mounted fixedly at 28, has its other end pressing against peripheral ridges 25' formed around shaft 25, in order to maintain the nylon rollers in continuous engagement with the outer periphery of the projection lens assembly tube 19.

In order to permit ready longitudinal adjustment of the projection lens assembly 13, a rubber coated roller 29 is rotatably mounted on a mounting shaft 30 in a position such that the periphery of the roller is adapted to be engaged by the outer surface of the projection lens assembly mounting tube 19 when the latter is disposed in seated position within trough 23. Suitable means 31 may be provided in order for manually rotating the roller 29 and effecting longitudinal adjustment of the projection lens assembly 13.

When it is desired to remove the projection lens assembly 13 from the projection lens assembly mounting housing 16, it is only necessary to move the lens assembly 13 forwardly and then press downwardly on the forward end 22 thereof. This raises the rear end of the mounting tube 19 and allows the peripheral collar 21 to clear the trough 23. This movement of the mounting tube 19 is permitted due to the resiliency of the spring 27 and the open topped slots within which the mounting shaft 25 is mounted.

Due to the unique construction of the projection lens assembly mounting tube, ready longitudinal adjustment of the projection lens assembly 13 is afforded and yet it is also convenient to remove the projection lens assembly 13 from the slide projector whenever it is necessary in order to clean or otherwise examine other features of the projector.

It is contemplated that numerous changes and modifications may be made in the present invention without departing from the spirit or scope thereof.

What is claimed is:

In a slide projector, the combination of a projection lamp and condenser lens assembly, means for mounting a transparent slide in optical alignment with said condenser lens assembly, a projection lens assembly disposed in optical alignment with said condenser lens assembly and reciprocal longitudinally with respect thereto for focusing an image of said slide on a viewing screen, said projection lens assembly comprising a plurality of lenses mounted within an elongated cylindrical tube member, an upwardly opening generally V-shaped trough for receiving and optically aligning said projection lens assembly with said condenser lens assembly, a pair of spring pressed rollers disposed above said cylindrical tube member and acting thereagainst for biasing said projection lens assembly downwardly into said trough for retaining the same in fixed position therein, means forming a peripheral collar at each end of said cylindrical tube member for limiting the longitudinal movement thereof in either direction, said collar at the rear end of said cylindrical tube member projecting only slightly beyond the periphery of said tube member whereby upon tilting of the forward end thereof downwardly the tube member is moved against the bias of said spring pressed rollers for facilitating removal of said projection lens assembly from within said V-shaped trough, and a manually rotatable friction roller disposed against said cylindrical tube for effecting longitudinal adjustment of said projection lens assembly.

References Cited in the file of this patent

UNITED STATES PATENTS

| | | |
|---|---|---|
| 2,380,829 | Eddy | July 31, 1945 |
| 2,518,671 | Eagle | Aug. 15, 1950 |

FOREIGN PATENTS

| | | |
|---|---|---|
| 677,704 | Great Britain | Aug. 20, 1952 |